(12) United States Patent
Ishikawa et al.

(10) Patent No.: US 9,382,961 B2
(45) Date of Patent: Jul. 5, 2016

(54) VIBRATION DAMPING DEVICE

(71) Applicant: SUMITOMO RIKO COMPANY LIMITED, Komaki-shi, Aichi (JP)

(72) Inventors: Ryota Ishikawa, Aichi-gun (JP); Noriaki Yoshii, Nagoya (JP); Kazuki Hotta, Toyota (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/710,242

(22) Filed: May 12, 2015

(65) Prior Publication Data
US 2015/0240901 A1    Aug. 27, 2015

Related U.S. Application Data

(63) Continuation of application No. PCT/JP2014/055337, filed on Mar. 3, 2014.

(30) Foreign Application Priority Data

Mar. 12, 2013    (JP) ................................. 2013-048638

(51) Int. Cl.
*F16F 1/38* (2006.01)
*F16M 13/02* (2006.01)

(52) U.S. Cl.
CPC ................. *F16F 1/3863* (2013.01); *F16F 1/38* (2013.01); *F16M 13/02* (2013.01)

(58) Field of Classification Search
CPC ... B64D 2027/262; B60K 5/1208; F16F 1/38; F16F 1/387; F16F 1/3863
See application file for complete search history.

(56) References Cited

U.S. PATENT DOCUMENTS

| 5,655,758 A | 8/1997 | Hadano et al. |
| 6,213,455 B1 * | 4/2001 | Kato ......................... F16F 1/38 267/140.12 |
| 7,445,201 B2 * | 11/2008 | Endo ...................... F16F 1/3863 267/141 |

FOREIGN PATENT DOCUMENTS

| JP | H08-268021 A | 10/1996 |
| JP | 2004-028250 A | 1/2004 |
| JP | 2006-132688 A | 5/2006 |
| JP | 2011-144891 A | 7/2011 |

OTHER PUBLICATIONS

Jun. 3, 2014 International Search Report issued in International Application No. PCT/JP2014/055337.
Sep. 15, 2015 International Preliminary Report on Patentability issued in International Patent Application No. PCT/JP2014/055337.
Apr. 25, 2016 Office Action issued in Chinese Patent Application No. 201480009683.5.

* cited by examiner

*Primary Examiner* — Rodney Mintz
*Assistant Examiner* — Daniel Kenny
(74) *Attorney, Agent, or Firm* — Oliff PLC (57) ABSTRACT

A vibration damping device including: an inner member; an outer cylindrical member into which an end portion of the inner member is inserted; a main rubber elastic body elastically connecting the end portion of the inner member and the outer cylindrical member in an axis-perpendicular direction; a support piece integrally provided with one axial end portion of the outer cylindrical member so as to protrude peripherally inward therefrom and be opposed to one axial end face of the inner member; and a connecting rubber provided between opposed faces of the end face of the inner member and the support piece of the outer cylindrical member so as to elastically connect them in an axial direction.

6 Claims, 5 Drawing Sheets

VIBRATION DAMPING DEVICE

INCORPORATED BY REFERENCE

The disclosure of Japanese Patent Application No. 2013-048638 filed on Mar. 12, 2013, including the specification, drawings and abstract is incorporated herein by reference in its entirety. This is a Continuation of International Application No. PCT/JP2014/055337 filed on Mar. 3, 2014.

BACKGROUND OF THE INVENTION

1. Field of the Invention

The present invention relates to a vibration damping device to be used, for example, for an automobile engine mount.

2. Description of the Related Art

Conventionally, there has been known a vibration damping device as a type of vibration damping connector or vibration damping supporter interposed between a power unit and members constituting a vibration transmission system such as the vehicular body that connects the members to each other in a vibration-damping manner. This vibration damping device has a structure where an inner member is inserted into an outer cylindrical member, for example, and the inner member and the outer cylindrical member are elastically connected to each other by a main rubber elastic body.

Since the main rubber elastic body is provided to connect the inner member and the outer cylindrical member in the axis-perpendicular direction in a vibration damping device, the spring force in the axis-perpendicular direction is composed of compression and tension spring components of the main rubber elastic body, which allows the dynamic spring constant to be set high, while the spring force in the axial direction is composed of shear spring component of the main rubber elastic body, which made it difficult to set the dynamic spring constant high enough.

Now, U.S. Pat. No. 7,445,201 proposes a structure where the inner member is extended outward beyond the outer cylindrical member in the axial direction to place opposite to each other in the axial direction a first flange portion provided on the extension of the inner member and a second flange portion provided at the axial end portion of the outer cylindrical member, while the first and second flange portions are elastically connected by a connecting rubber in the axial direction. According to this structure, since the dynamic spring constant in the axial direction can be set high based on the compression and tension spring components of the connecting rubber, the spring constant becomes adjustable with a high degree of freedom not only in the axis-perpendicular direction but also in the axial direction.

However, in the structure of U.S. Pat. No. 7,445,201, as one tries to secure a large space for arranging the connecting rubber, there will be a need for extending the inner member beyond the outer cylindrical member in the axial direction to protrude substantially outward in the axial direction depending on the configuration of the inner member, as shown in FIG. 5 of U.S. Pat. No. 7,445,201, and this may cause a problem such as increase in size in the axial direction and increased weight. In addition, a first flange portion needs to be formed on the inner member to support the connecting rubber, which could pose problems including further increase in the weight and complication in shape of the inner member.

SUMMARY OF THE INVENTION

The present invention has been developed in view of the above-described matters as the background, and it is an object of the present invention to provide a vibration damping device with a novel structure where the dynamic spring constants both in the axial and axis-perpendicular directions can be set with a high degree of freedom, while achieving compactization of the device in the axial direction.

The above and/or optional objects of this invention may be attained according to at least one of the following aspects of the invention. The following aspects and/or elements employed in each aspect of the invention may be adopted at any possible optional combinations.

That is, a first aspect of the present invention provides a vibration damping device comprising: an inner member; an outer cylindrical member into which an end portion of the inner member is inserted; a main rubber elastic body elastically connecting the end portion of the inner member and the outer cylindrical member in an axis-perpendicular direction; a support piece integrally provided with one axial end portion of the outer cylindrical member so as to protrude peripherally inward therefrom and be opposed to one axial end face of the inner member; and a connecting rubber provided between opposed faces of the end face of the inner member and the support piece of the outer cylindrical member so as to elastically connect them in an axial direction.

By using the vibration damping device with the structure according to the first aspect, a relatively high spring constant can be set in the axis-perpendicular direction due to the compression and tension spring components of the main rubber elastic body, while a relatively high spring constant can be set in the axial direction due to the compression and tension spring components of the connecting rubber. This improves the degree of freedom in setting the spring ratios in the axis-perpendicular and axial directions, which enables higher responsiveness to the required vibration damping characteristics.

In addition, since the connecting rubber is arranged between the opposing faces in the axial direction of the end face of the inner member inserted in place into the outer cylindrical member and the support piece of the outer cylindrical member, any increase in size of the device in the axial direction due to the arrangement of the connecting rubber can be prevented.

A second aspect of the present invention provides the vibration damping device according to the first aspect, wherein the inner member includes a concave portion on the one axial end face thereof, and the connecting rubber is bonded to an inner face of the concave portion.

According to the second aspect, by having the connecting rubber bonded to the inner face of the concave portion, the free length and rubber volume of the connecting rubber can be secured large enough without requiring any increase in size in the axial direction, thus enhancing the durability of the connecting rubber. Weight reduction can also be achieved at the same time by providing the inner member with a lightening hole.

A third aspect of the present invention provides the vibration damping device according to the second aspect, wherein the concave portion is formed so as to partially open in a circumferential direction to an outer peripheral surface of the inner member, while the main rubber elastic body is bonded to the outer peripheral surface of the inner member at a location away from an opening of the concave portion in the circumferential direction.

According to the third aspect, bonding of the connecting rubber is made easier by forming the concave portion with a cutout shape, while by having the main rubber elastic body bonded to the inner member at a location away from the concave portion, the bonding area between the main rubber elastic body and the inner member can be secured large enough, thus enabling to efficiently obtain the spring force in the axis-perpendicular direction.

A fourth aspect of the present invention provides the vibration damping device according to any one of the first through third aspects, wherein the main rubber elastic body and the connecting rubber are placed substantially opposite to each other across a central axis of the inner member.

According to the fourth aspect, since the inner member is elastically connected to the outer cylindrical member by the main rubber elastic body and the connecting rubber across the central axis, the inner member and the outer cylindrical member get less likely to generate prizing or torsional displacement in response to an input in the axial or axis-perpendicular direction, thus enabling to achieve intended vibration damping performance in a simple and effective manner.

A fifth aspect of the present invention provides the vibration damping device according to any one of the first through fourth aspects, wherein the connecting rubber is integrally formed with the main rubber elastic body.

According to the fifth aspect, there is no need for forming the connecting rubber separately from the main rubber elastic body, which enables to achieve a reduction in the number of working processes, simplification in the structure of metal molds, a reduction in the number of parts and the like. The integral formation of the connecting rubber and the main rubber elastic body can be achieved, for example, by means of forming a rubber elastic body that integrally connects the connecting rubber with the main rubber elastic body on the surface of the inner member and the inner peripheral surface of the outer cylindrical member to cover them.

A sixth aspect of the present invention provides the vibration damping device according to any one of the first through fifth aspects, further comprising a bracket member having a cylindrical portion and fitted to the outer cylindrical member at the cylindrical portion, wherein the bracket member includes a reinforcing piece provided to one axial end portion of the cylindrical portion so as to be overlapped with the support piece of the outer cylindrical member from outside in the axial direction.

According to the sixth aspect, by reinforcing the support piece to be provided to the outer cylindrical member by the reinforcing piece, the support piece is less subject to deformation at the time of load input in the axial direction so that any damage to the support piece can be avoided, while the intended spring force in the axial direction is effectively exerted. Especially, since the deformation of the support piece can well be prevented by overlapping the reinforcing piece even if the deformation rigidity of the single support piece is relatively small, light-weight aluminum alloy or the like can be used as a forming material of the outer cylindrical member, thus achieving a weight reduction of the device.

A seventh aspect of the present invention provides the vibration damping device according to the sixth aspect, further comprising a rubber layer provided between overlapped faces of the support piece of the outer cylindrical member and the reinforcing piece of the bracket member.

According to the seventh aspect, since the error in relative position between the support piece and the reinforcing piece in their overlapping direction caused by dimensional tolerance of each member or the like can be tolerated by elastic deformation of the rubber layer in the thickness direction, problems such as striking noise generated by the abutment of the support piece against the reinforcing piece at the time of input in the axial direction can be avoided.

According to the present invention, the support piece formed at one axial end portion of the outer cylindrical member is arranged in opposition to the inner member in the axial direction, and the support piece and the axial end face of the inner member are elastically connected by the connecting rubber in the axial direction. This allows the spring force in the axial direction to be set based on the compression and tension spring components of the connecting rubber, which enables to set a relatively high spring constant in the axial direction, thus improving the degree of adjustment freedom of the spring ratios in the axial and axis-perpendicular directions. In addition, since the axial end face of the inner member inserted into the outer cylindrical member is elastically connected to the support piece by the connecting rubber, an increase in size of the device in the axial direction is also avoided.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described in reference to the drawings.

FIGS. 1 to 4 show an engine mount 10 for an automobile as a first embodiment of the vibration damping device with a structure according to the present invention. The engine mount 10 is provided with a mount body 11 having a structure where an inner member 12 and an outer cylindrical member 14 are elastically connected by a main rubber elastic body 16. As a general rule, in the following descriptions, the up-down direction means the up-down direction in FIG. 1, which is the vertical direction of the device mounted on the vehicle, and the left-right direction means the left-right direction in FIG. 1, which is the lateral direction of the vehicle with the device mounted thereon, and the front-rear direction means the up-down direction in FIG. 3, which is the front-rear direction of the vehicle with the device mounted thereon.

Figure 5:
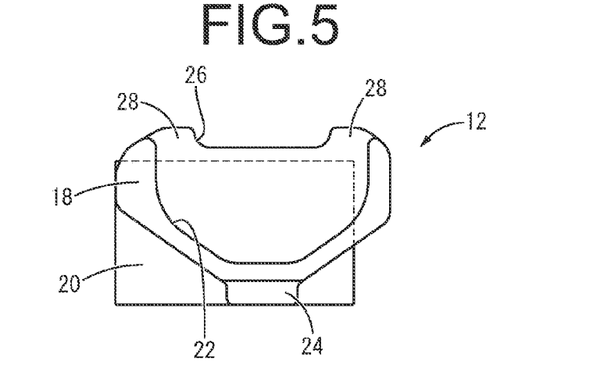
FIG. 5 is a rear view of an inner member constituting the engine mount shown in FIG. 1.
Figure 6:
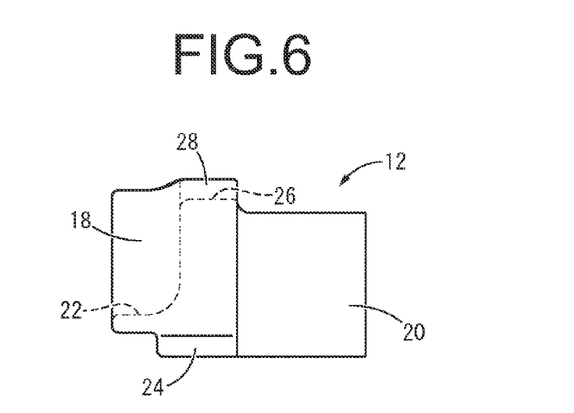
FIG. 6 is a left-side view of the inner member shown in FIG. 5.
Figure 7:
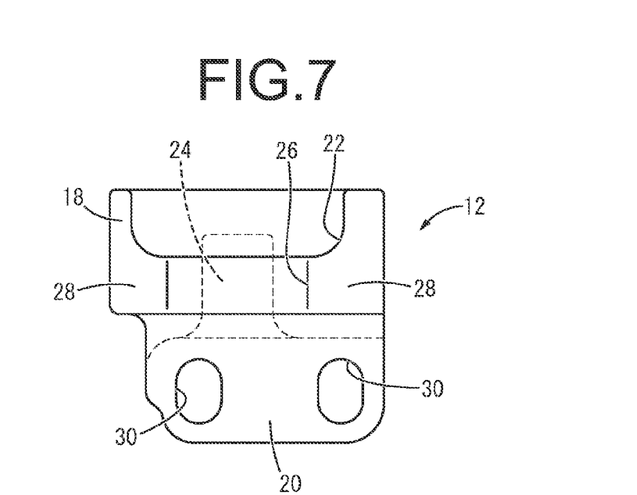
FIG. 7 is a plan view of the inner member shown in FIG. 5.

More specifically, the inner member 12, a high rigidity member formed of iron, aluminum alloy or the like, is integrally provided with an anchor portion 18 that constitutes one axial end portion of the inner member 12 (left side in FIG. 6)

and a mounting portion 20 that constitutes the other axial end portion thereof (right side in FIG. 6), as shown in FIGS. 5 to 7.

The anchor portion 18 is a solid block made in a tapered shape that gradually narrows toward the bottom in the lower portion, and a concave portion 22 is formed at one axial end portion thereof. The concave portion 22 is formed on one axial end face of the anchor portion 18, while being formed to partially open to the outer peripheral surface along the circumference of the anchor portion 18, and in the present embodiment, it opens to the upper surface of the anchor portion 18. In addition, the concave portion 22 has its lower portion widening toward the upper portion where a large width is secured.

Furthermore, at the other axial end portion of the anchor portion 18, a stopper protrusion 24 is integrally formed to protrude downward. In addition, in a portion constituting a front wall of the concave portion 22 of the anchor portion 18, a groove 26 is formed to open to the upper face extending in the axial direction, and abutting protrusions 28 are formed on both sides of the groove 26 in the widthwise direction.

The mounting portion 20 is a solid block extending in the up-down direction with almost a constant cross-section and is provided with bolt holes 30 that penetrate therethrough in the up-down direction. The mounting portion 20 is integrally formed to protrude from the anchor portion 18 toward the other axial side.

Figure 8:
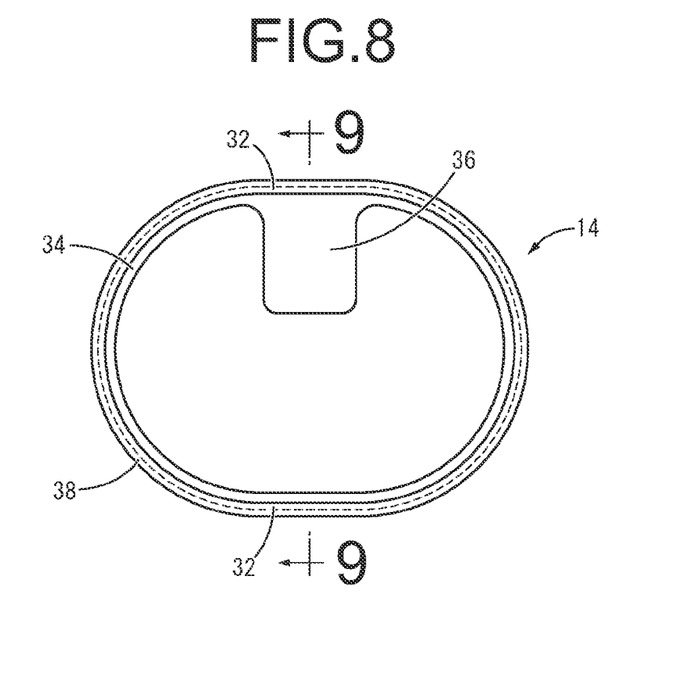
FIG. 8 is a front view of an outer cylindrical member constituting the engine mount shown in FIG. 1.
Figure 9:
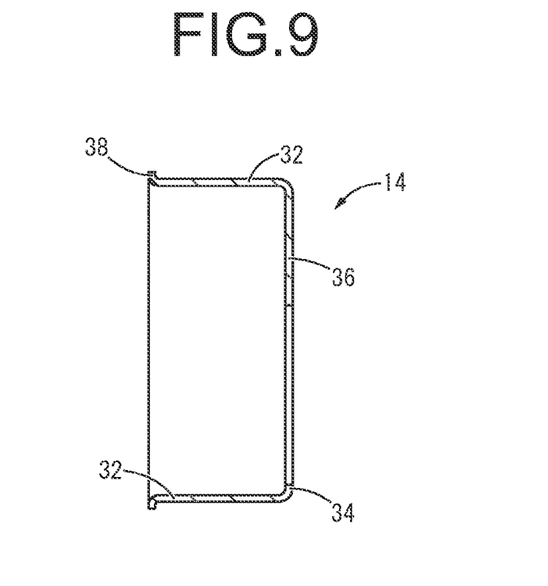
FIG. 9 is a cross sectional view taken along line 9-9 of FIG. 8.

Meanwhile, the outer cylindrical member 14 is a high rigidity member made of such as iron or aluminum alloy like the inner member 12, and is made in a thin, large-diameter cylinder as shown in FIGS. 8 and 9. The outer cylindrical member 14 can be made in a circular cylinder shape, but in the present embodiment, it is in a shape of an elliptical cylinder shape where a flat plate portion 32 is formed on each of the top and bottom sides thereof extending in the axial direction with a given width.

Moreover, at one axial end portion of the outer cylindrical member 14, an inner flange portion 34 is integrally formed all around the circumference protruding peripherally inward. In addition, the inner flange portion 34 is made to have a significant protrusion toward the inner periphery at the upper flat plate portion 32, which forms a support piece 36 in a shape of a flat plate extending peripherally inward in the axis-perpendicular direction. Also, at the other axial end portion of the outer cylindrical member 14, a flange portion 38 is integrally provided to protrude peripherally outward.

The inner member 12 and the outer cylindrical member 14 with the structure described above are configured such that the anchor portion 18 that constitutes the end portion of the inner member 12 is inserted in place into the inner peripheral side of the outer cylindrical member 14, and the anchor portion 18 of the inner member 12 and the outer cylindrical member 14 are elastically connected by the main rubber elastic body 16 in the axis-perpendicular direction.

Figure 10:
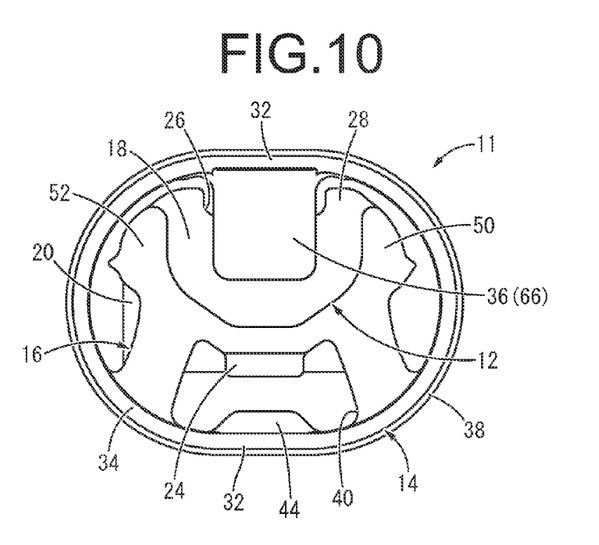
FIG. 10 is a rear view of a mount body constituting the engine mount shown in FIG. 1.

The main rubber elastic body 16 extends in the up-down direction between the inner member 12 and outer cylindrical member 14 with the length of its circumference gradually increasing toward the bottom, while, by having a bored section 40 at the center in the circumferential direction penetrating therethrough in the axial direction, it is made like a pair of tilting legs to extend away from each other toward the bottom in the circumferential direction. Then, the top end of the main rubber elastic body 16 is bonded by vulcanization to the lower portion of the inner member 12 made in a tapered shape, while the bottom end thereof is bonded by vulcanization to the inner peripheral face of the outer cylindrical member 14 on both sides in the circumferential direction across the lower flat plate portion 32. This allows the mount body 11 to be formed as an integrally vulcanization-molded product of the main rubber elastic body 16 provided with the inner member 12 and the outer cylindrical member 14. The main rubber elastic body 16 is bonded to the outer peripheral surface (top, bottom, left and right faces) of the inner member 12 at a location away from the opening of the concave portion 22 in the circumferential direction. Also, the stopper protrusion 24 of the inner member 12 protrudes into the bored section 40 at the center thereof in the circumferential direction.

In addition, the inner peripheral surface of the outer cylindrical member 14 is covered almost entirely by a covering rubber 42 that is integrally formed with the main rubber elastic body 16. Moreover, the covering rubber 42 is made partially thicker at the center of the bored section 40 in the circumferential direction, and a stopper rubber 44 protruding toward the stopper protrusion 24 of the inner member 12 is integrally formed with the covering rubber 42. Then, by having the stopper protrusion 24 of the inner member 12 and the outer cylindrical member 14 abutted against each other via the stopper rubber 44, a bound stopper means that restricts relative displacement downward of the inner member 12 against the outer cylindrical member 14 is configured. The stopper protrusion 24 of the inner member 12 is covered by a lower buffer rubber 46 that is integrally formed with the main rubber elastic body 16.

In addition, an upper buffer rubber 48 that is integrally formed with the main rubber elastic body 16 is bonded to the top face of each of the abutting protrusions 28, 28 of the inner member 12, and by having the abutting protrusions 28, 28 and the outer cylindrical member 14 abutted against each other via the upper buffer rubbers 48, 48, a rebound stopper means that restricts relative displacement upward of the inner member 12 against the outer cylindrical member 14 is configured. Moreover, on the left and right sides of the inner member 12, left and right buffer rubbers 50, 52 which are integrally formed with the main rubber elastic body 16 are bonded respectively, and by having the inner member 12 and the outer cylindrical member 14 abutted against each other via the left and right buffer rubbers 50, 52, a left and right stopper means that restricts relative displacement between the inner member 12 and the outer cylindrical member 14 in the left-right direction is configured.

Figure 1:
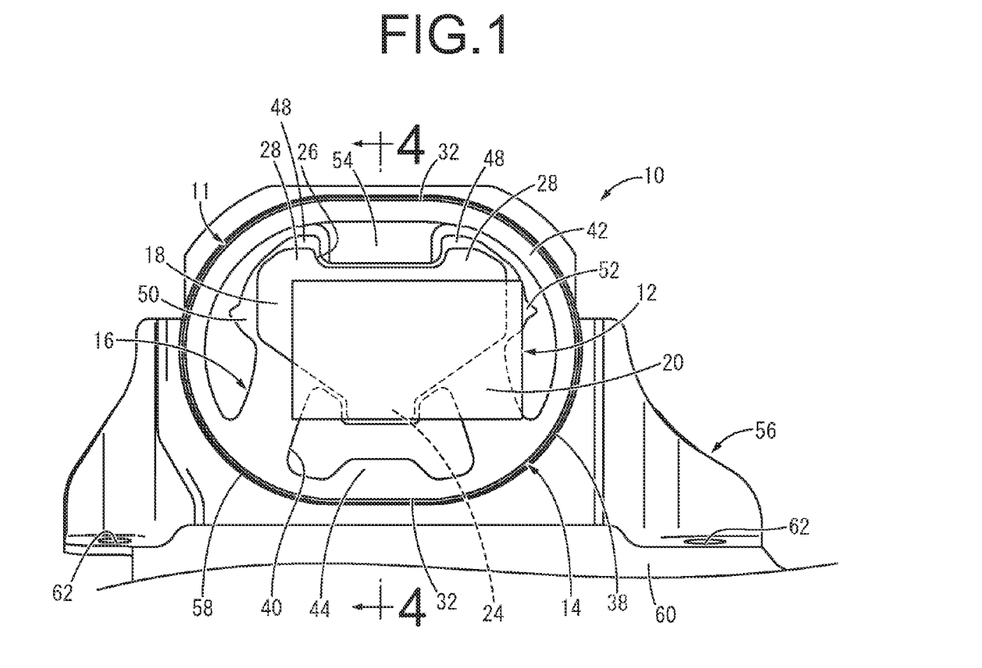
FIG. 1 is a front view of a vibration damping device in the form of an engine mount as a first embodiment of the present invention.
Figure 2:
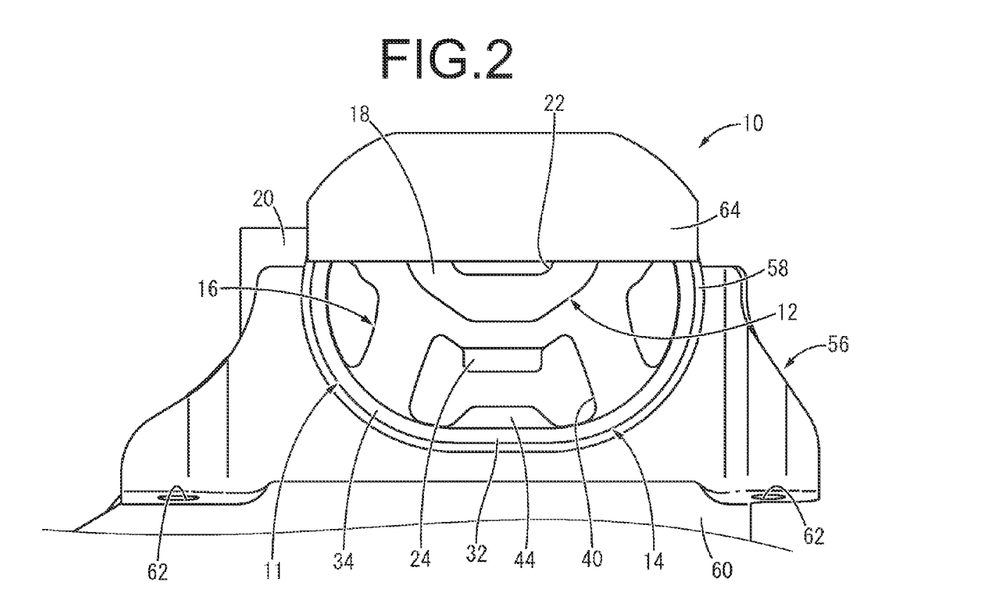
FIG. 2 is a rear view of the engine mount shown in FIG. 1.
Figure 3:
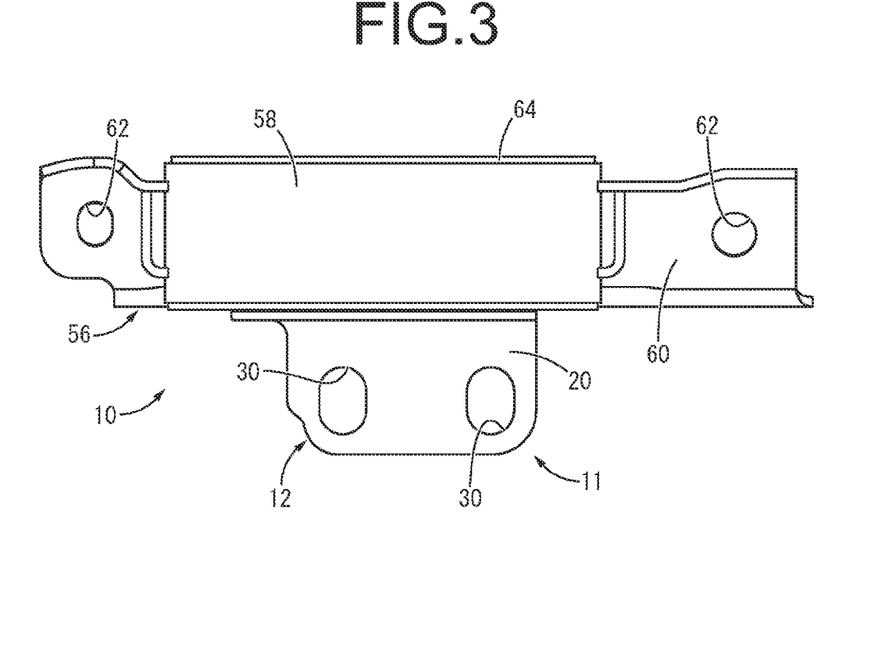
FIG. 3 is a plan view of the engine mount shown in FIG. 1.
Figure 4:
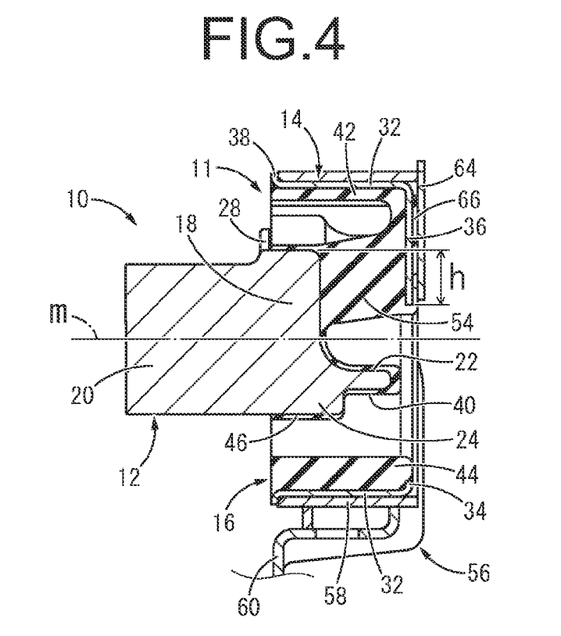
FIG. 4 is a cross sectional view taken along line 4-4 of FIG. 1.

Also, as shown in FIG. 4, the anchor portion 18 of the inner member 12 and the support piece 36 of the outer cylindrical member 14 are arranged at an overlapping location with each other in the axial projection, and the axial end face of the anchor portion 18 and the axial inner face of the support piece 36 are opposed to each other in the axial direction at a given distance. In the present embodiment, the support piece 36 protrudes beyond the upper flat plate portion 32 of the outer cylindrical member 14 and the protruding tip of the support piece 36 is opposed to the top end of the anchor portion 18 where the concave portion 22 opens in the up-down direction within the range of the height 'h'.

Then, between the anchor portion 18 and the support piece 36 that are arranged to oppose to each other, a connecting rubber 54 is arranged. The connecting rubber 54 is bonded to the inner face of the concave portion 22 that constitutes one axial end face of the anchor portion 18, while being bonded to the axial inner face of the support piece 36 of the outer cylindrical member 14. And the anchor portion 18 and the support piece 36 are elastically connected by the connecting rubber 54. In addition, the connecting rubber 54 of the present embodiment is formed integrally with the main rubber elastic body 16, which can reduce the number of molding processes as well as the number of parts. The top face of the connecting rubber 54 is spaced apart downward from the inner peripheral face of the outer cylindrical member 14, while the bottom face thereof is spaced apart upward from the lower wall inner face of the concave portion 22.

In addition, the connecting rubber 54 gradually slopes down in the axial direction toward the inner member 12, and both its top and bottom faces are sloped. Therefore, the free length of the connecting rubber 54 can be secured large enough to enhance the durability of the connecting rubber 54, while in the process of forming the connecting rubber 54 with a simple metal mold that is divisible into two parts in the axial direction, the metal mold can easily be removed from the surface of the connecting rubber 54.

Also, the connecting rubber 54 is located above the central axis 'm' of the inner member 12 that extends in the front-rear direction, while the main rubber elastic body 16 is located below the central axis so that the main rubber elastic body 16 and the connecting rubber 54 are located substantially opposite to each other across the central axis 'm' of the inner member 12, and the inner member 12 is elastically connected on the upper and lower sides to the outer cylindrical member 14. In addition, since the main elastic axis of the connecting rubber 54 in the front-rear direction slopes down backward (toward the left in FIG. 4), the inner member 12 is stably positioned and held in place in the up-down direction by the main rubber elastic body 16 and the connecting rubber 54.

In this way, the inner member 12 and the outer cylindrical member 14 are elastically connected by the main rubber elastic body 16 and the connecting rubber 54 in the axis-perpendicular and axial directions, respectively. Accordingly, the spring constant in the axis-perpendicular directions (up-down and left-right directions) is set mainly by the compression and tension spring components of the main rubber elastic body 16, while the spring constant in the axial direction (front-rear direction) is set mainly by the compression and tension spring components of the connecting rubber 54. Needless to say, tuning of the spring force is possible correspondingly to the spring characteristics required in each direction by means of adjusting the cross-sectional shape of the main rubber elastic body 16 and the connecting rubber 54.

Figure 11:
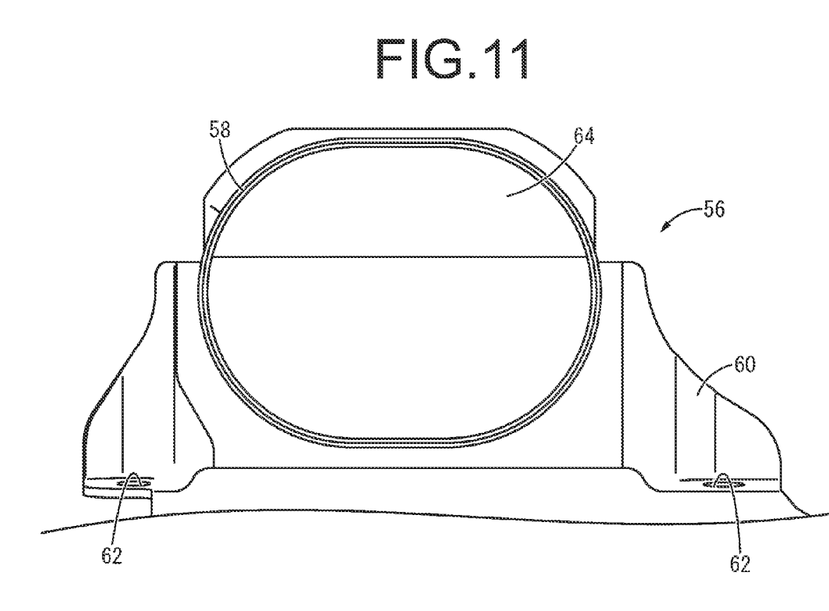
FIG. 11 is a front view of an outer bracket constituting the engine mount shown in FIG. 1.

Also, an outer bracket 56, as a bracket member, is attached to the mount body 11 having a structure where the inner member 12 and the outer cylindrical member 14 are elastically connected by the main rubber elastic body 16 and the connecting rubber 54. The outer bracket 56, as shown in FIG. 11, has a structure where a fixing portion 60 to be fixed to the vehicular body, not shown, is fixedly installed, by means such as welding, to a cylindrical portion 58 in an elliptical cylinder shape that is provided with an inner peripheral face roughly corresponding to the outer peripheral face of the outer cylindrical member 14. In the fixing portion 60, a plurality of bolt holes 62 are formed.

In addition, the upper part of the cylindrical portion 58 is fixedly provided with a reinforcing piece 64 protruding peripherally inward. The reinforcing piece 64, made in a flat plate that expands in the axis-perpendicular direction extending in the left-right direction, is overlapped with the axial end face of the cylindrical portion 58 to be fixed thereto by means such as welding so as to enhance the rigidity of the cylindrical portion 58 by the reinforcing piece 64.

Then, the outer bracket 56 is attached to the mount body 11 by pressing the outer cylindrical member 14 of the mount body 11 into the cylindrical portion 58 of the outer bracket 56, and by fitting and fixing the cylindrical portion 58 to the outer cylindrical member 14. Under these circumstances, as shown in FIG. 4, the reinforcing piece 64 of the outer bracket 56 is overlapped with the support piece 36 of the outer cylindrical member 14 from outside in the axial direction. Accordingly, the deformation rigidity of the support piece 36 is enhanced by the reinforcing piece 64, thus preventing deformation of the support piece 36 in the thickness direction.

In addition, a rubber layer 66 formed integrally with the connecting rubber 54 is bonded to the axial outer face of the support piece 36, and the dimensional errors are tolerated by having the rubber layer 66 interposed between the overlapped faces of the support piece 36 and the reinforcing piece 64. This enables to prevent a gap between the overlapped faces of the support piece 36 and the reinforcing piece 64, thus avoiding any striking noise and the like caused by abutment of the support piece 36 against the reinforcing piece 64.

The engine mount 10 with the structure described above is made to be mounted to a vehicle by means of having the mounting portion 20 of the inner member 12 fixed to the power unit, not shown, by fixing bolts, not shown either, that are inserted through the bolt holes 30, and having the fixing portion 60 of the outer bracket 56 fixed to the vehicular body, not shown, by fixing bolts, not shown either, that are inserted through the bolt holes 62 so as to have the outer cylindrical member 14 mounted to the vehicular body via the outer bracket 56.

Under such conditions of the engine mount 10 being mounted to a vehicle, a relatively high spring constant can be set in the up-down and left-right directions of the vehicle due to the compression and tension spring components of the main rubber elastic body 16. This allows the power unit to be supported at a proper position in a vibration damping manner, while exerting the intended vibration damping effect in response to inputs such as the up-down bounce and left-right rolling.

Meanwhile, in the front-rear direction of the vehicle, it is made possible to set a relatively high spring constant due to the compression and tension spring components of the connecting rubber 54. Thus, the power unit is supported at a proper position in a vibration damping manner, while vibration damping effects can be obtained against inputs in the front-rear direction such as torque reaction forces. These allow the engine mount 10 to have a higher degree of tuning freedom of the spring ratios in the axial and axis-perpendicular directions, thus achieving the required vibration damping performance more sophisticatedly.

Especially in the present embodiment, the inner member 12 and the outer cylindrical member 14 are elastically connected by the main rubber elastic body 16 below the central axis 'm' of the inner member 12, while being elastically connected by the connecting rubber 54 above the central axis 'm.' This allows the inner member 12 to be elastically positioned against the outer cylindrical member 14 in a more stable manner, while preventing prizing or torsional displacement or the like of the inner member 12 against the outer cylindrical member 14 at the time of load input, thus enabling to obtain the intended vibration damping performance.

Also, in the engine mount 10, the connecting rubber 54 for setting a spring constant in the front-rear direction is arranged between the inner member 12 and the support piece 36, where the axial end face of the inner member 12 is arranged in opposition to the support piece 36 of the outer cylindrical member 14. By using the end face of the inner member 12 this way, there is no need to especially provide the inner member 12 with a bonding structure of the connecting rubber 54, thus enabling to achieve elastic connection in the axial direction by the connecting rubber 54 with a simple structure.

Moreover, the axial front end of the inner member 12 can be inserted in place into the axial front end of the outer cylindrical member 14 without extending axially outside thereof, and there is no need to extend the inner member 12 in the axial direction, thus achieving compactization in the axial direction as well as weight reduction of the device.

Especially in the present embodiment, since the concave portion 22 is formed in the anchor portion 18 of the inner member 12 to open to the axial front end thereof, and the connecting rubber 54 is bonded to the inner face of the concave portion 22, the rubber volume (free length) of the connecting rubber 54 can be secured large enough while avoiding an increase in size in the axial direction. In addition, since the concave portion 22 has a cutout shape that opens to the axial front end face and the top face thereof, the connecting rubber 54 can easily be bonded by vulcanization to the concave portion 22.

In addition, since the main rubber elastic body 16 is bonded to the lower face of the outer peripheral face of the inner member 12 away from the opening of the concave portion 22 in the circumferential direction, a substantial bonding area of the main rubber elastic body 16 can be obtained in the axial direction in the lower part of the anchor portion 18 while securing a space for arrangement of the connecting rubber 54 large enough in the upper part of the anchor portion 18. Therefore, substantial rubber volumes of both the connecting rubber 54 and the main rubber elastic body 16 can be obtained to further improve the degree of freedom in tuning the spring force in the axial and axis-perpendicular directions as well as to enhance the durability of not only the connecting rubber 54 but also the main rubber elastic body 16 or the like.

Embodiments of the present invention have been described above, but the present invention is not limited by those specific descriptions. For example, in one of the above embodiments, the main rubber elastic body 16 and the connecting rubber 54 are integrally formed, but the main rubber elastic body and the connecting rubber can be separate elements. That is, if the main rubber elastic body and the connecting rubber are made of different rubber materials, for example, it is possible to set different characteristics required for each.

Also, the specific structures of the main rubber elastic body 16 and the connecting rubber 54 are just examples, and the main rubber elastic body can be extending in the up-down direction without being divided along the circumference by the bored section 40, or the connecting rubber can be formed in plurality along the circumference, for example.

Also, in order to efficiently obtain the rubber volume (free length) of the connecting rubber, it is desirable to form the concave portion 22, but if the durability of the connecting rubber is fully secured, for example, the concave portion 22 can be omitted. Furthermore, as the shape of the concave portion is not particularly limited, it can either open only to the axial end face of the inner member or can open to the left and right faces in addition to the axial end face and the top face.

Also, the bracket member can be installed as needed but is not essential. Moreover, in case of installing the bracket member, the reinforcing piece to be overlapped with the support piece is dispensable.

Also, the present invention can be applied not only to vibration damping devices for motor vehicles but also is applicable to vibration damping devices used for motor cycles, railroad vehicles, industrial vehicles and the like. In addition, the scope of application of the present invention is not limited to the engine mount but also can be extended to the motor mount, body mount, sub-frame mount and the like.

What is claimed is:

1. A vibration damping device comprising:
an inner member;
an outer cylindrical member into which an end portion of the inner member is inserted;
a main rubber elastic body elastically connecting the end portion of the inner member and the outer cylindrical member in an axis-perpendicular direction;
a support piece integrally provided with one axial end portion of the outer cylindrical member so as to protrude peripherally inward therefrom and be opposed to one axial end face of the inner member; and
a connecting rubber provided between the one axial end face of the inner member and an opposing end face of the support piece of the outer cylindrical member so as to elastically connect them in an axial direction,
wherein the inner member includes a concave portion on the one axial end face thereof, and the connecting rubber is bonded to an inner face of the concave portion.

2. The vibration damping device according to claim 1, wherein the concave portion is formed so as to partially open in a circumferential direction to an outer peripheral surface of the inner member, while the main rubber elastic body is bonded to the outer peripheral surface of the inner member at a location away from an opening of the concave portion in the circumferential direction.

3. The vibration damping device according to claim 1, wherein the main rubber elastic body and the connecting rubber are placed substantially opposite to each other across a central axis of the inner member.

4. The vibration damping device according to claim 1, wherein the connecting rubber is integrally formed with the main rubber elastic body.

5. The vibration damping device according to claim 1, further comprising a bracket member having a cylindrical portion and fitted to the outer cylindrical member at the cylindrical portion, wherein the bracket member includes a reinforcing piece provided to one axial end portion of the cylindrical portion so as to be overlapped with the support piece of the outer cylindrical member from outside in the axial direction.

6. The vibration damping device according to claim 5, further comprising a rubber layer provided between overlapped faces of the support piece of the outer cylindrical member and the reinforcing piece of the bracket member.

* * * * *